(12) United States Patent
Song

(10) Patent No.: US 10,536,562 B2
(45) Date of Patent: Jan. 14, 2020

(54) DISPLAY APPARATUS AND THE CONTROLLING METHOD THEREOF

(71) Applicant: SAMSUNG ELECTRONICS CO., LTD., Suwon-si (KR)

(72) Inventor: Myung-guen Song, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 344 days.

(21) Appl. No.: 15/293,465

(22) Filed: Oct. 14, 2016

(65) Prior Publication Data

US 2017/0111484 A1 Apr. 20, 2017

(30) Foreign Application Priority Data

Oct. 16, 2015 (KR) .................. 10-2015-0144501

(51) Int. Cl.
*H04L 29/06* (2006.01)
*H04L 29/08* (2006.01)
*H04N 21/4363* (2011.01)

(52) U.S. Cl.
CPC .............. *H04L 69/18* (2013.01); *H04L 67/10* (2013.01); *H04L 69/02* (2013.01)

(58) Field of Classification Search
CPC ........ G06F 1/1679; G06F 13/12; G06F 13/38; H04N 5/445; H04N 5/268; H04B 1/3888
USPC ........................................................ 710/72
See application file for complete search history.

(56) References Cited

U.S. PATENT DOCUMENTS

| 2008/0218505 | A1 | 9/2008 | Choi |
| 2009/0256963 | A1 | 10/2009 | Sato |
| 2011/0317587 | A1* | 12/2011 | Lida ................. H04L 12/2832 370/254 |

(Continued)

FOREIGN PATENT DOCUMENTS

| JP | 2009253390 A | 10/2009 |
| JP | 2011160181 A | 8/2011 |

(Continued)

OTHER PUBLICATIONS

Communication dated Jan. 26, 2017 issued by the International Searching Authority in counterpart International Application PCT/KR2016/011491 (PCT/ISA/210 & 237).

(Continued)

*Primary Examiner* — Getente A Yimer
(74) *Attorney, Agent, or Firm* — Sughrue Mion, PLLC

(57) ABSTRACT

Disclosed is a display apparatus. The display apparatus includes a first input port configured to receive information that relates to an external device; a second input port configured to facilitate a communication with the external device and to receive a control command; and a processor configured to control the second input port to automatically select a communication protocol that corresponds to the second input port based on the received information that relates to the external device, and to perform communication with the external device via the second input port by using the selected communication protocol. Accordingly, a display apparatus may automatically select the communication protocol corresponding to the external device without requiring a user to manually set the communication protocol on a display apparatus, and user convenience may be improved.

18 Claims, 12 Drawing Sheets

(56) References Cited

U.S. PATENT DOCUMENTS

| | | | |
|---|---|---|---|
| 2012/0203877 A1* | 8/2012 | Bartholomay | H04L 63/0227 |
| | | | 709/221 |
| 2013/0172049 A1 | 7/2013 | Duong et al. | |
| 2013/0335430 A1 | 12/2013 | Douglass et al. | |
| 2014/0132839 A1* | 5/2014 | Chang | H04N 5/4403 |
| | | | 348/570 |
| 2014/0160667 A1* | 6/2014 | Van Velzen | G06F 1/1632 |
| | | | 361/679.41 |
| 2014/0222862 A1 | 8/2014 | Arling et al. | |
| 2016/0038837 A1* | 2/2016 | Fujioka | G06F 1/1628 |
| | | | 463/31 |
| 2016/0142647 A1* | 5/2016 | Gopinath | G06F 16/783 |
| | | | 348/706 |

FOREIGN PATENT DOCUMENTS

| | | |
|---|---|---|
| JP | 2011259050 A | 12/2011 |
| KR | 1020090038660 A | 4/2009 |
| KR | 1020100089328 A | 8/2010 |
| KR | 10-2014-0081042 A | 7/2014 |
| KR | 10-2015-0075827 A | 7/2015 |

OTHER PUBLICATIONS

Communication dated Mar. 3, 2017 issued by the European Patent Office in counterpart European Patent Application No. 16193196.9.

Communication dated Apr. 1, 2019, issued by the European Patent Office in counterpart European Application No. 16 193 196.9.

* cited by examiner

| Data Byte | 1 | 2 | 3 | 4 | 5 | 6 | 7 | 8 | 9 | 10 | 11 | 12 | 13 | 14 | 15 | 16 | ~ | 24 | 25 |
|---|---|---|---|---|---|---|---|---|---|---|---|---|---|---|---|---|---|---|---|
| Character | S | A | M | S | U | N | G | | B | D | - | P | 1 | 6 | 0 | 0 | | 01h | 0Ah |
| | Vendor Name ||||||||  Model Name ||||||||| SUPPORT IMAGE QUALITY MODE | PRODUCT GROUP |
| | 210 |||||||| 220 ||||||||| 240 | 230 |

FIG. 3
300

| InfoFrame Type Code | InfoFrame Type = 03 $_{16}$ |
|---|---|
| InfoFrame Version Number | Version = 01$_{16}$ |
| Length of Source Product Description InfoFrame | Length of Source Product Description InfoFrame = 25 |

310 {
| | | |
|---|---|---|
| Data Byte 1 | 0 | Vendor Name Character 1 VN1 (7bit ASCII code) |
| Data Byte 2 | 0 | Vendor Name Character 2 VN2 |
| Data Byte 3 | 0 | Vendor Name Character 3 VN3 |
| Data Byte 4 | 0 | Vendor Name Character 4 VN4 |
| Data Byte 5 | 0 | Vendor Name Character 5 VN5 |
| Data Byte 6 | 0 | Vendor Name Character 6 VN6 |
| Data Byte 7 | 0 | Vendor Name Character 7 VN7 |
| Data Byte 8 | 0 | Vendor Name Character 8 VN8 |

320 {
| | | |
|---|---|---|
| Data Byte 9 | 0 | Product Description Character 1 PD1 (7-bit ASCII code) |
| Data Byte 10 | 0 | Product Description Character 2 PD 2 |
| Data Byte 11 | 0 | Product Description Character 3 PD 3 |
| Data Byte 12 | 0 | Product Description Character 4 PD 4 |
| Data Byte 13 | 0 | Product Description Character 5 PD 5 |
| Data Byte 14 | 0 | Product Description Character 6 PD 6 |
| Data Byte 15 | 0 | Product Description Character 7 PD 7 |
| Data Byte 16 | 0 | Product Description Character 8 PD 8 |
| Data Byte 17 | 0 | Product Description Character 9 PD 9 |
| Data Byte 18 | 0 | Product Description Character 10 PD 10 |
| Data Byte 19 | 0 | Product Description Character 11 PD 11 |
| Data Byte 20 | 0 | Product Description Character 12 PD 12 |
| Data Byte 21 | 0 | Product Description Character 13 PD 13 |
| Data Byte 22 | 0 | Product Description Character 14 PD 14 |
| Data Byte 23 | 0 | Product Description Character 15 PD 15 |
| Data Byte 24 | 0 | Product Description Character 16 PD 16 |

330 —
| Data Byte 25 | Source Device Information |
|---|---|

| Code | Source Device Information |
|---|---|
| 00h | unknown |
| 01h | Digital STB |
| 02h | DVD player |
| 03h | D-VHS |
| 04h | HDD Vidorecorder |
| 05h | DVC |
| 06h | DSC |
| 07h | Video CD |
| 08h | Game |
| 09h | PC general |
| 0Ah | Blu-Ray Disc (BD) | ~331 |
| 0Bh | Super Audio CD |
| 0Ch ... FFh- | Reserved |

DISPLAY APPARATUS AND THE CONTROLLING METHOD THEREOF

CROSS-REFERENCE TO RELATED APPLICATION(S)

This application claims priority under 35 U.S.C. § 119(a) from Korean Patent Application No. 10-2015-0144501, filed on Oct. 16, 2015, in the Korean Intellectual Property Office, the disclosure of which is hereby incorporated by reference in its entirety.

TECHNICAL FIELD

Exemplary embodiments relate to a display apparatus and a controlling method thereof, and more particularly, to a display apparatus which automatically sets a communication protocol and a controlling method thereof.

BACKGROUND

With the advancement of digital technology, various types of electronic products have been developed and distributed. In particular, various display apparatuses such as television (TV), a mobile phone, a personal computer (PC), a notebook PC, and a personal digital assistant (PDA) are widely used in typical households.

While use of the display apparatuses has been increasing, user needs with respect to a variety of functions have been increasing. Accordingly, the efforts of each manufacturer to satisfy user needs have increased, and a new product having new functions has been emerging in markets.

In particular, the display apparatus may be connected to a device such as a set-top box, receive various broadcast contents, and provide a viewer with the contents. Here, the display apparatus may be connected by using a port of HDMI (i.e., high definition multimedia interface) and a port of UART (i.e., Universal Asynchronous Receiver Transmitter), receive a video and an audio signal via the HDMI port, and communicate with a set-top box via the UART port.

In the meantime, the display apparatus, when being used in conjunction with a set-top box, should use the communication protocol corresponding to the set-top box, but until now, a user may be required to directly select a desired communication protocol on a setting menu displayed in the display apparatus, and thus, such a requirement is inconvenient to a user.

SUMMARY

One or more exemplary embodiments may overcome the above disadvantages and other disadvantages not described above. However, it will be understood by a person of ordinary skill in the art that one or more exemplary embodiments are not required to overcome the disadvantages described above, and may not overcome any of the problems described above.

One or more exemplary embodiments provide a display apparatus which selects a communication protocol based on the received information regarding the external device and a method thereof.

According to an exemplary embodiment, a display apparatus includes a first input port configured to receive information that relates to an external device; a second input port configured to facilitate a communication with the external device and to receive a control command; and a processor configured to control the second input port to automatically select a communication protocol that corresponds to the second input port based on the received information that relates to the external device, and to perform the communication with the external device via the second input port by using the selected communication protocol.

The information that relates to the external device may include at least one from among information that relates to a manufacturer of the external device, a name of the external device, and a product group that relates to the external device.

The information that relates to the external device may be stored in a source production description (SPD) packet.

The SPD packet may include a plurality of fields which respectively indicate the information that relates to the manufacturer of the external device, the name of the external device, and the product group that relates to the external device.

The first input port may be configured in accordance with a high definition multimedia interface (HDMI) specification.

The display apparatus, according to an exemplary embodiment, may further include a storage configured to store information that relates to a plurality of communication protocols, and the processor may be further configured to select the communication protocol that corresponds to the second input port from among the plurality of communication protocols based on the received information that relates to the external device.

The apparatus may further include a communicator configured to communicate with a server, and the processor may be further configured to receive, from the server via the communicator, information that relates to a communication protocol required for communicating with the external device, and to communicate with the external device based on the information that relates to the communication protocol received from the server.

The apparatus may further include a storage configured to store information that relates to a plurality of communication protocols, and the processor may further configured to control the storage to store the information that relates to the communication protocol received from the server, and to update the information that relates to the plurality of communication protocols.

The second input port may be configured to use a universal asynchronous receiver transmitter (UART) communication method.

The apparatus may further include a photographer, and the processor may be further configured to use the photographer for recognizing a quick response (QR) code attached to the external device, and to obtain the information that relates to the external device based on the recognized QR code.

The processor may be further configured to receive, from the external device, information that relates to an image and a sound via the first input port, and to receive the control command for controlling the display device via the second input port.

According to an exemplary embodiment, a method for controlling a display apparatus which includes a first input port configured to receive information that relates to an external device and a second input port configured to facilitate a communication with the external device and to receive a control command is provided. The method includes automatically selecting a communication protocol that corresponds to the second input port based on the received information that relates to the external device; and performing the communication via the second input port with the external device by using the selected communication protocol.

The information that relates to the external device may include at least one from among information that relates to a manufacturer of the external device, a name of the external device, and a product group that relates to the external device.

The information that relates to the external device may be stored in a source product description (SPD) packet.

The SPD packet may include a plurality of fields which respectively indicate the information that relates to the manufacturer of the external device, the name of the external device, and the product group that relates to the external device.

The first input port may be configured in accordance with a high definition multimedia interface (HDMI) specification.

The selecting may include selecting the communication protocol from among a plurality of communication protocols based on the received information that relates to the external device.

The selecting may include receiving, from a server, information that relates to a communication protocol required for communicating with the external device, and the performing the communication may include communicating with the external device based on the information that relates to the communication protocol received from the server.

The method may further include storing the information that relates to the communication protocol received from the server and updating information that relates to a plurality of communication protocols.

The second input port may be configured to use a universal asynchronous receiver transmitter (UART) communication method.

According to the aforementioned various exemplary embodiments, a user may automatically select a communication protocol corresponding to the external device without manually setting the communication protocol on the display apparatus and thus, user convenience may increase.

BRIEF DESCRIPTION OF THE DRAWINGS

The above and/or other aspects will be more apparent by describing in detail exemplary embodiments, with reference to the accompanying drawings, in which:

FIGS. 2 and 3 are views to describe an SPD packet, according to an exemplary embodiment.

DETAILED DESCRIPTION

Figure 1:
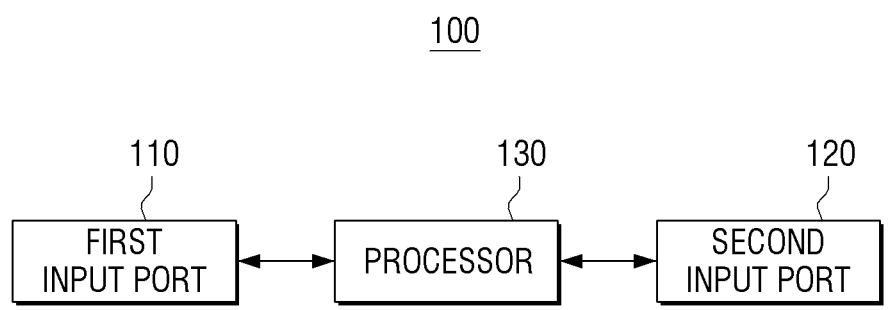
FIG. 1 is a block diagram of a display apparatus, according to an exemplary embodiment.

Hereinafter, the terms used to describe exemplary embodiments will be briefly explained, and exemplary embodiments will be described in greater detail with reference to the accompanying drawings.

Although the terms used to describe the exemplary embodiments are general terms, which are widely used in the present time considering the functions in the present disclosure, the terms may be changed depending on an intention of a person of ordinary skill in the art, a precedent, and introduction of new technology. In addition, in a special case, terms selected by the applicant may be used. In this case, the meaning of the terms will be explained in detail in the corresponding detailed descriptions. Therefore, the terms used in the exemplary embodiments should be defined based on the meaning thereof and the descriptions of the present disclosure, rather than based on their names only.

Although specific exemplary embodiments are illustrated in the drawings and relevant detailed descriptions are provided, various changes can be made and various exemplary embodiments may be provided. Accordingly, various exemplary embodiments of the present disclosure are not limited to the specific embodiments and should be construed as including all changes and/or equivalents or substitutes included in the ideas and technological scopes of exemplary embodiments of the present disclosure. In the following description, well-known functions or constructions are not described in detail since they would obscure the exemplary embodiments in unnecessary detail.

Hereinafter, exemplary embodiments will be described in greater detail with reference to the accompanying drawings. The matters defined in the description, such as detailed construction and elements, are provided to assist in a comprehensive understanding of the exemplary embodiments. However, it is apparent that the exemplary embodiments can be carried out by those of ordinary skill in the art without those specifically defined matters. In the description of the exemplary embodiment, certain detailed explanations of related art are omitted when it is deemed that they may unnecessarily obscure the essence of the exemplary embodiments. In the explanation of the drawings, similar reference numerals are used for similar elements.

FIG. 1 is a block diagram of a display apparatus, according to an exemplary embodiment.

Referring to FIG. 1, a display apparatus 100 includes a first input port 110, a second input port 120, and a processor 130.

In this aspect, the display apparatus 100 may be embodied as any of various types of electronic devices, such as a TV, e-board, e-table, a large format display (LFD), a smartphone, a tablet, a desktop PC, and a notebook. In particular, the display according to an exemplary embodiment may be connected through the set-top box, HDMI, and UART, and the display apparatus which is connected to the set-top box through each of an HDMI and a UART communication method can be included.

In addition, the display apparatus 100 may receive contents from the set-top box connected using the HDMI and the UART communication method and provide the same to a viewer. In particular, the display apparatus 100 may receive a video signal and an audio signal relating to contents from the set-top box through HDMI communication, communicate with the set-top box through UART communication, and receive a control command.

The first input port 110 may receive information relating to an external device. In this aspect, the external device includes an electronic device which exists outside the display apparatus 100, may perform communication with the display apparatus 100 through wireless and/or wired communication methods, and transmit contents or a control command to the display apparatus 100. For example, the external device according to an exemplary embodiment may be embodied mainly as a set-top box.

In particular, information regarding the external device may include information that relates to at least one of a manufacturer of the external device, a name of the external device, and a product group that relates to the external device.

More particularly, information regarding the manufacturer of the external device may include information regarding a name of the manufacturer. For example, when the manufacturer of the external device is "Samsung Electronics," information regarding the manufacturer of the external device may include information regarding a name of the manufacturer, such as, for example, "SAMSUNG."

In addition, information regarding a name of the external device may include information regarding a model name of the external device or information regarding a name of manufacturing used for manufacturing of the external device. For example, information regarding a name of the external device can be indicated such as "BD-P1600", or a device type including a manufacturing serial number of the external device.

In addition, information that relates to the product group of the external device may include information indicating which type of electronic device the external device belongs to. For example, the information that relates to the product group of the external device may include whether the external device corresponds to a DVD player, a game console, or Blue-ray disk device, or the like.

In addition, information that relates to the external device may include various information including information relating to supportable image quality or resolution supportable by the external device and information that relates to settings of the external device, in addition to the information of the manufacturer of the external device, a name of the external device, and a product group of the external device.

Further, as an example, the aforementioned first input port may be configured in accordance with a specification of a high definition multimedia interface (HDMI), and the external device connected to the first input port may be a HDMI-supportable electronic device that is connectible with the display apparatus 100 via the HDMI.

In this aspect, HDMI refers to one of the interface specifications which can transmit non-compressed digital video and audio signals in an integrated manner, and this is a well-known art which will not be further described.

Further, the second input port 120 may be used to facilitate communication with the external device and may be configured to receive a control command.

Herein, the second input port may be an input port which uses a UART (Universal Asynchronous Receiver Transmitter) communication method. The UART may perform functions such as converting and/or recovering parallel data to series bit stream; adding parity bits; detecting or removing parity; and/or adding and deleting a start bit and a stop bit for non-synchronized communication. Such UART devices, generally, may be used in accordance with communication standards such as RS-232, RS-422, and RS-485.

Accordingly, the display apparatus 100 may communicate with the external device via the second input port 120, and receive a control command to control the display apparatus 100 from the external device. For example, when a user sends a control signal that relates to a channel change or a volume change of the display apparatus 100 to the external device via a remote controller, the external device may send a control command for the channel change or the volume change of the display apparatus 100 to the display apparatus 100 via the second input port 120 of the display apparatus 100.

In addition, the display apparatus 100 may perform communication with the external device via the second input port 120 and transceive preset data, and for example, the display apparatus 100 may transceive channel information by performing communication with the external device via the second input port 120.

In addition, the processor 130 may automatically select a communication protocol of the second input port 120 based on information relating to the external device received via the first input port 110, and control to communicate with the external device via the second port 120 by using the selected communication protocol.

In particular, the processor 130, based on the information that relates to the external device that is received via the first input port 110, may identify the external device, and select a communication protocol required for communicating with the external device via the second input port 120. In this aspect, a required communication protocol may be selected based on information relating to the external device, and such a communication protocol may be individually compatible with the external device. That is, when the external device changes, the communication protocol required for the display apparatus 100 to communicate with the external device via the second input port 120 may change.

In particular, the processor 130 may automatically select the communication protocol of the second input port 120 necessary for communicating with the external device based on information that relates to the manufacturer of the external device, the name of the external device, and the product group of the external device.

For example, a lookup table within which a communication protocol corresponding to at least one of the information that relates to the manufacturer of the external device, the name of the external device, and the product group of the external device is set and stored may have been prestored in the storage (not shown) in the display apparatus 100, and accordingly, the processor 130 may select a communication protocol corresponding to the information that relates to the external device within the lookup table based on at least one of the information that relates to the manufacturer of the external device, the name of the external device, and the product group of the external device.

In particular, when a manufacturer of the external device is A, a name of the external device is B, and a product group of the external device is a DVD player, if a communication protocol required for communicating with the external device within the look-up table is set to protocol A, the processor 130 may automatically select the communication protocol of the second input port 120 required for communicating with the external device as protocol A.

In addition, if a manufacturer of the external device is A, when the communication protocol required for communicating with the external device within the lookup table is set to protocol A regardless of a name of a device and a product group, the processor 130 may identify information that relates to a manufacturer which manufactures the external device, and automatically select the communication protocol of the second input port 120 required for communicating with the external device as protocol A.

Further, information that relates to the external device may be stored in a Source Product Description (SPD) packet.

FIGS. 2 and 3 are views to describe SPD packet, according to an exemplary embodiment.

Referring to FIG. 2, an SPD packet 200 may be composed of a total of 25 bytes, and the SPD packet 200 may include various information that relates to the external device. In addition, the display apparatus 100 may receive the SPD packet 200 from the external device via the first input port 110, and in particular, the display apparatus 100 may receive the SPD packet 200 from the external device via HDMI communication.

More particularly, eight (8) bytes out of 25 bytes of the SPD packet 200 may be used to indicate information 210 that relates to a manufacturer which manufactures the external device; eight (8) out of 25 bytes may be used to indicate information 220 that relates to a name of the external device; and one (1) out of 25 bytes may be used to indicate information 230 that relates to a product group of the external device. In addition, one (1) out of 25 bytes may be used to indicate information 240 that relates to a quality mode of the external device.

As such, the SPD packet 200 may include additional information, such as information 240 that relates to an image quality mode which is supportable by the external device, in addition to information 210 that relates to a manufacturer of the external device, information 220 that relates to a name of the external device, and information 230 that relates to a product group of the external device.

Referring back to FIG. 2, in one example, the information 210 that relates to a manufacturer of the external device indicates one character per byte using 7 out of 8 bytes, and a name of a manufacturer indicated by 7 bytes is "SAMSUNG."

In addition, in this example, the information 220 that relates to a name of the external device indicates a character per byte using all of the 8 bytes, and it can be known that a name of the device indicated by 8 bytes is "BD-P1600."

In addition, in this example, the information 230 that relates to a product group of the external device uses 1 byte, indicating a product group using "0Ah". To further describe the SDP packet 200, FIG. 3 can be referred to.

Referring to FIG. 3, a table 300 provides information that relates to each byte of the SPD packet 200.

As illustrated in FIG. 3, a table 300 is divided to InfoFrame Type Code and InfoFrame Type, and the InfoFrame Type Code indicates bytes constituting the SPD packet 200, and InfoFrame Type indicates information indicated by each byte.

In particular, Data Bytes 1 to 8 310 of the InfoFrame Type Code may be used to indicate the information 210 that relates to a manufacturer of the external device as illustrated in FIG. 2. For example, Data Byte 1 to Data Byte 8 310 may indicate each textual character of the information that relates to a manufacturer, and in this example, Data Byte 1 may include information that relates to an "S", Data Byte 2 includes "A", Data Byte 3 includes "M", Data Byte 4 includes "S", Data Byte 5 includes "U", Data Byte 5 includes "N", and Data Byte 6 includes "G".

In addition, Data Bytes 9 to 16 320 of the InfoFrame Type Code may be used to indicate the information 220 that relates to a name of the external device as illustrated in FIG. 2. For example, Data Byte 9 to Data Byte 16 320 may indicate each textual character of information that relates to a name of a device, and in this example, Data Byte 9 may include information that relates to a "B", Data Byte 10 for "D", Data Byte 11 for "-", Data Byte 12 for "P", Data Byte 13 for "1", Data Byte 14 for "6", Data Byte 15 for "0" and Data Byte 16 for "0".

In addition, Data Byte 25 330 of the InfoFrame Type Code may be used to indicate the information 230 that relates to a product group. For example, the Data Byte 25 330 may include information referring to still another table which includes information that relates to various product groups, and still another table may be set to unknown for "00h" code, to digital STB for "01h", and DVD player is set for "02h" code. As such, information that relates to different types of product groups is matched with respect to a preset code.

In particular, information 230 that relates to a product group of the SPD packet 200 as illustrated in FIG. 2 includes "0Ah" code, and within still another table, it is described that "0Ah" code refers to a Blu-ray disk (BD) 331, and in this manner, the processor 130 can be made aware that the product group of the external device is a Blu-ray disk player.

As described in aforementioned FIGS. 2 and 3, the SPD packet 200 received from the external device may include various information relating to the external device, and accordingly, the processor 130 may identify the external device by using the received SPD packet and obtain the information relating to a manufacturer of the external device, a name of a device, and product group.

Further, the processor 130, based on the obtained information that relates to a manufacturer of the external device, a name of a device, and a product group, may automatically select a communication protocol that corresponds to the second input port 120, and by using the selected communication protocol, may control to communicate with the external device via the second input port 120.

Figure 4:
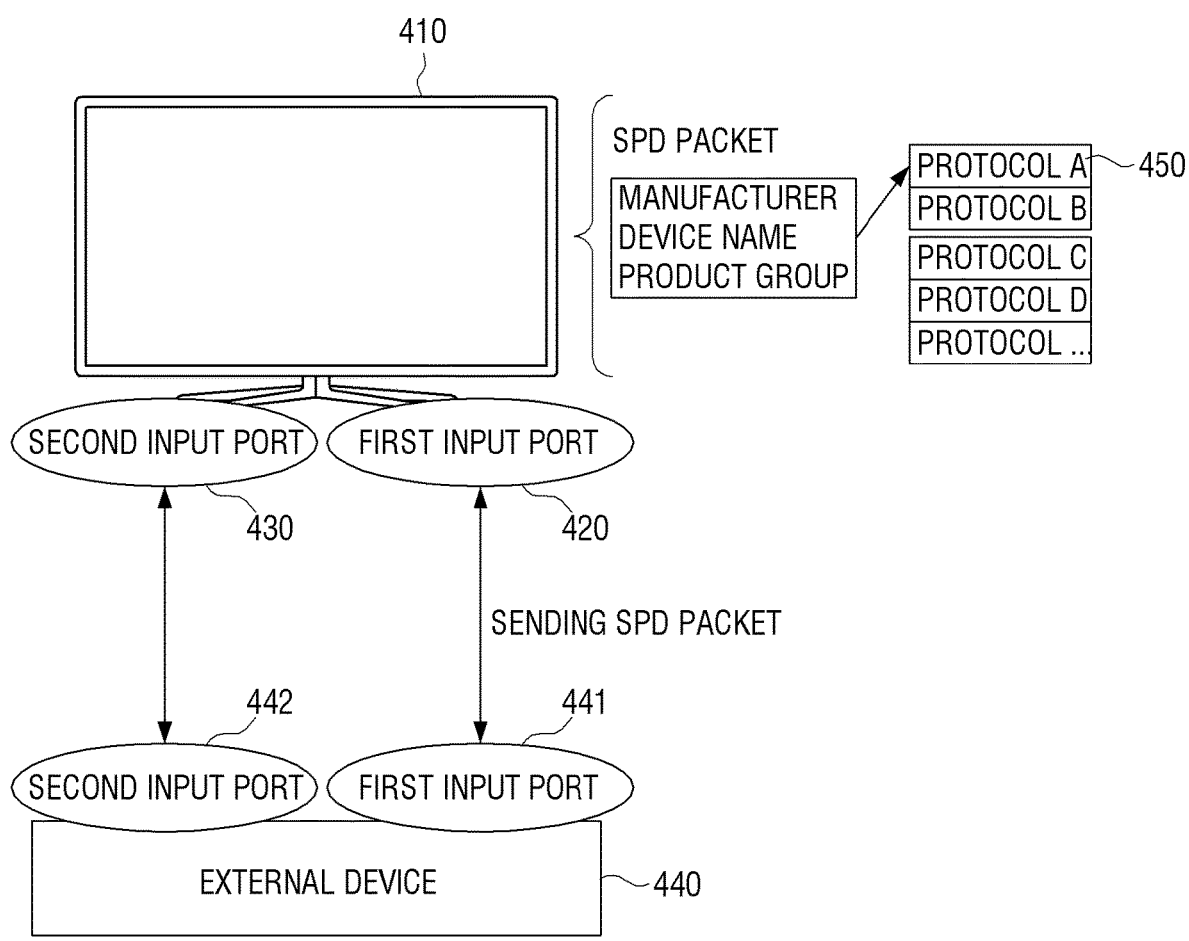
FIG. 4 is a view to describe a process of selecting a communication protocol and performing communication, according to an exemplary embodiment.

FIG. 4 is a view to describe a process of selecting a communication protocol and performing communication, according to an exemplary embodiment.

Referring to FIG. 4, a display apparatus 410 and an external device 440 are connected via first input ports 420 and 441 and second input ports 430 and 442, and the display apparatus 410 may receive a video signal and an audio signal from the external device 440 via the first input ports 420 and 441, communicate with the external device via the second input ports 430 and 442, and receive a control command.

In this aspect, the first input ports 420, 441 are configured in accordance with an HDMI specification, and the second input ports 430, 442 are configured in accordance with a communication specification of a UART method such as RS-232.

In addition, the display apparatus 410 may receive the SPD packet which includes information that relates to the external device 440 from the external device 440 via the first input ports 420, 441, and the SPD packet may include information that relates to at least one of a manufacturer of the external device, a name of the external device, and a product group of the external device.

In addition, the processor 130 of the display apparatus 10 may automatically select a communication protocol that corresponds to the second input ports 430, 442 based on the information that relates to a manufacturer, the name of device, and the product group included in the received SPD packet.

In particular, the processor 130, from among various information that relates to one or more communication protocols stored in the storage (not shown) of the display apparatus 410, may select a communication protocol that corresponds to the second input ports 430, 442 based on information that relates to a manufacturer, a name of device, and a product group included in the received SPD packet, and it is seen in FIG. 4 that protocol A 450 is selected from among a plurality of communication protocols A, B, C, D, etc.

For example, protocol A can be matched and set when a manufacturer of the external device 440 is A, a name of a device is A, and a product group is A; protocol B can be matched and set when a manufacturer of the external device 440 is B, a name of a device is B, and a product group is B; and protocol C can be matched and set when a manufacturer of the external device 440 is C, a name of a device is C, and a product group is C; and protocol D can be matched and set when a manufacturer of the external device 440 is D, a name of a device is D, and a product group is D.

In this aspect, FIG. 4 illustrates that, as a result of detecting information that relates to the external device 440 included in the SPD packet by the processor 130, it is determined that a manufacturer of the external device 440 is A, name of the device is A, and a product group is A, and thus, protocol A 450 is selected from among a plurality of communication protocols A, B, C, D, etc.

Accordingly, the processor 130 may control to communicate with the external device 440 via the second input port 430 by using protocol A, which is the selected communication protocol. In particular, the processor 130 may connect a communication session with the external device 440 by using the selected protocol A, and when the communication is ready as the communication session is connected, data may be transmitted to the external device 440 via the second input port 430, and data may be received from the external device 440.

Figure 5:
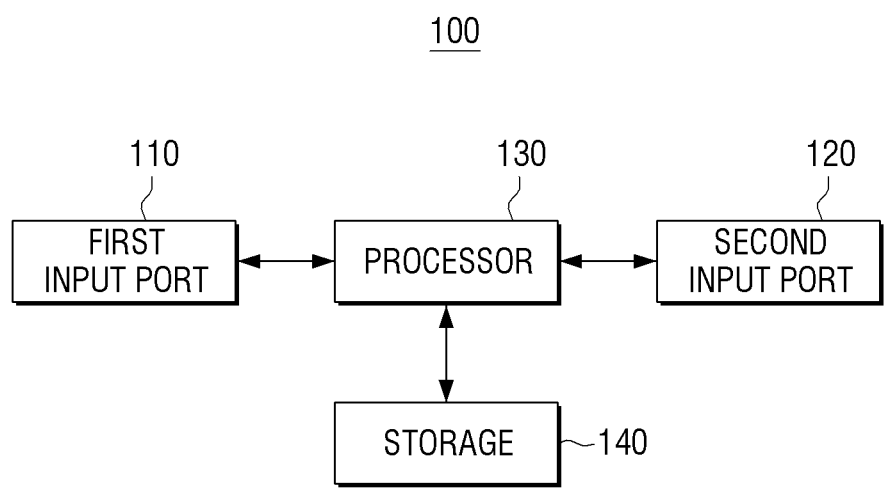
FIG. 5 is a block diagram illustrating the features of a display apparatus, according to another exemplary embodiment.

FIG. 5 is a block diagram illustrating the features of a display apparatus, according to another exemplary embodiment.

Referring to FIG. 5, the display apparatus 100 may include the first input port 110, the second input port 120, the processor 130, and a storage 140. In this aspect, the first input port 110, the second input port 120, and the processor 130 have been described above, and further description will be omitted.

The storage 140 may store information that relates to a plurality of communication protocols. In particular, the processor 130 may select a communication protocol that is required for performing communication with the external device from among a plurality of communication protocols based on information that relates to the external device.

As illustrated in FIG. 4, information about a plurality of protocols A, B, C, D . . . may be stored in the storage 140, and the processor 130, based on the SPD packet which includes the information that relates to the external device, may select a communication protocol required for communicating with the external device from among information that relates to a plurality of protocols A, B, C, D . . . stored in the storage 140.

As illustrated in FIG. 5, when information that relates to a plurality of communication protocols is stored in the storage 140, even though the display apparatus 100 is not connected with an external server via a network, the processor 130 may select a communication protocol based on information that relates to the external device, but the case where the display apparatus 100 is connected with an external server via network can be assumed as well.

Figure 6:
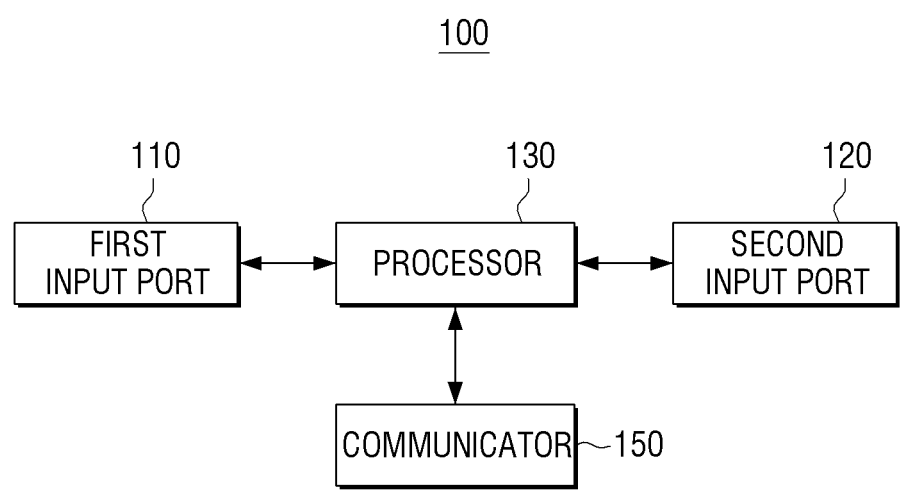
FIG. 6 is a block diagram illustrating a configuration of the display apparatus, according to another exemplary embodiment.

FIG. 6 is a block diagram illustrating a configuration of the display apparatus, according to another exemplary embodiment.

Referring to FIG. 6, the display apparatus 100 includes the first input port 110, the second input port 120, the processor 130, and a communicator 150, and the first input port 110, the second input port 120, and the processor 130 have been described above, and further description will be omitted.

The communicator 150 may communicate with a server, transmit data to a server, and/or receive data from a server, and in particular, the communicator 150 may communicate with a server by using any of various communication methods such as BT (BlueTooth), Wi-Fi (Wireless Fidelity), Zigbee, IR (Infrared), Serial Interface, USB (Universal Serial Bus), and NFC (Near Field Communication).

In particular, the processor 130, based on information that relates to the external device, may receive information that relates to a communication protocol required for communicating with the external device from a server, and based on the received communication protocol information, may communicate with the external device.

In this aspect, the processor 130, instead of selecting a communication protocol required for communicating with the external device from among a plurality of communication protocols prestored in the storage 140 based on FIG. 4, may transmit information that relates to the external device to a server, a server may search for and select information that relates to a communication protocol corresponding to the external device based on the information that relates to the external device received from the display apparatus 100, and transmit the communication protocol information to the display apparatus 100, and accordingly, the processor 130, based on the information that relates to communication protocols received from the server, may select communication protocols required for communicating with the external device and then perform communication with the external device.

Figure 7:
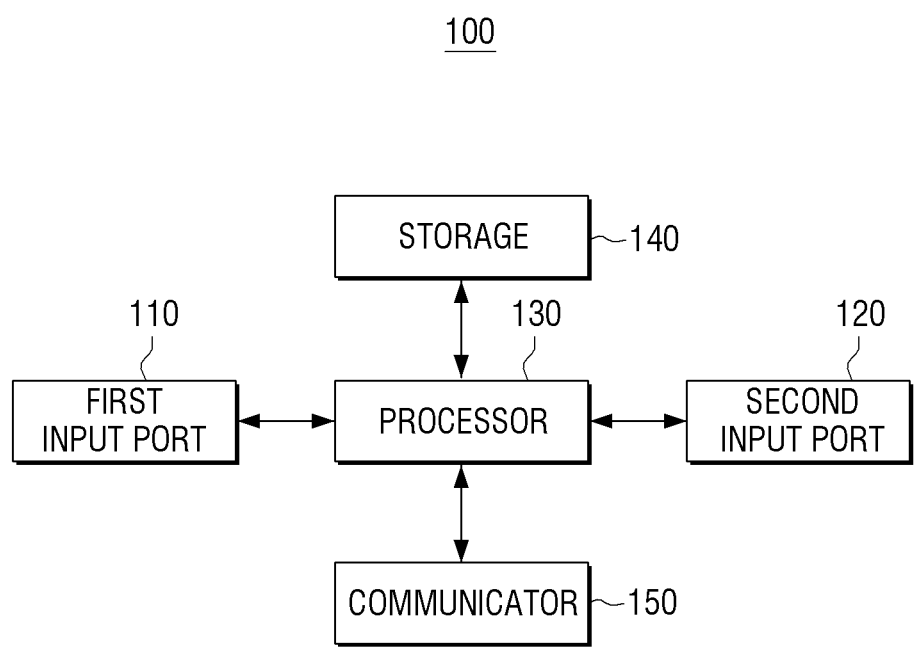
FIG. 7 is a block diagram illustrating a configuration of another display apparatus, according to an exemplary embodiment.

FIG. 7 is a block diagram illustrating a configuration of another display apparatus, according to an exemplary embodiment.

Referring to FIG. 7, the display apparatus 100 may include the first input port 110, the second input port 120, the processor 130, the storage 140, and the communicator 150.

In particular, the storage 140 may store information that relates to a plurality of communication protocols, and the communicator 150 may communicate with a server, and the processor 130 may update information that relates to a plurality of communication protocols by storing additional information that relates to the communication protocol received from a server in the storage 140.

For example, if it is assumed that the processor 130 cannot select a communication protocol from among a plurality of communication protocols A, B, C, and D stored in the storage 140 based on the received information that relates to the external device, the processor 130 may search for communication protocol E which is required for communicating with the external device based on the information that relates to the external device, and transmit information that relates to the protocol E to the display apparatus 100. Accordingly, the processor 130 may store additional information that relates to the communication protocol E which had previously not been stored in the storage 140 in the storage 140, and update information that relates to a plurality of communication protocols.

Accordingly, when the external device using the communication protocol E is connected with the display apparatus 100, the processor 130 may select the communication protocol E based on the information that relates to a plurality of protocols stored in the storage 140 without transmitting information that relates to the external device to a server.

Further, it can be assumed that information that relates to the external device may be received by using any of various methods other than the case of receiving information that relates to the external device via the first input port 110, that is, the port that is configured in accordance with an HDMI specification.

Figure 8:
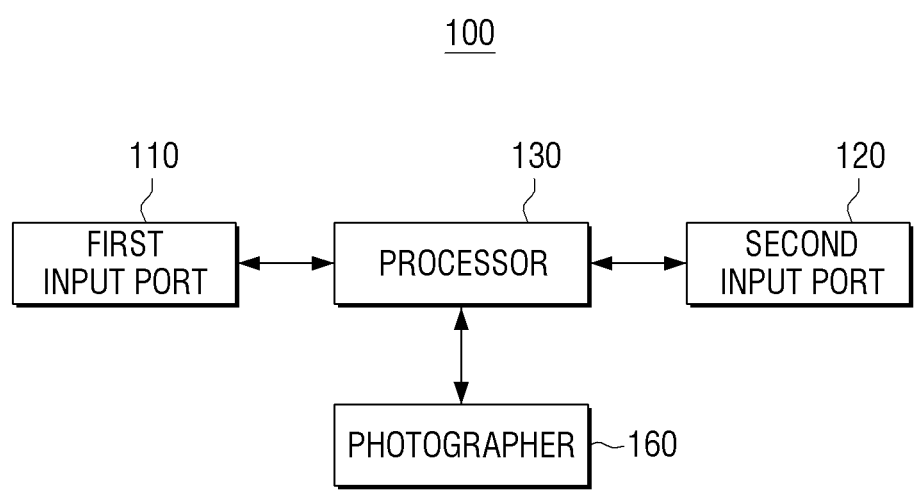
FIG. 8 is a block diagram illustrating a configuration of a display apparatus, according to still another exemplary embodiment.

FIG. 8 is a block diagram illustrating a configuration of a display apparatus, according to still another exemplary embodiment.

Referring to FIG. 8, the display apparatus 100 may include the first input port 110, the second input port 120, the processor 130, and a photographer 160, and here, the first input port 110, the second input port 120, and the processor 130 have been described above and further description will be omitted.

The photographer 160 may obtain an image that relates to an object, read a barcode, and/or recognize an image of a preset pattern.

In particular, the processor 130, via the photographer 160, may read a QR (Quick Response) code attached to the external device, and obtain information that relates to the external device based on the read QR code.

For example, the QR code attached to the external device may include a manufacturer of the external device, a name of the external device, and information that relates to a product group of the external device, and accordingly, the processor 130 may receive the information that relates to a manufacturer, a name of a device, and a product group by reading the QR code of the external device recognized via the photographer 160. In addition, based on the obtained information that relates to a manufacturer of the external device, a name of a device, and a product group, a communication protocol that corresponds to the second input port 120 can be automatically selected.

In addition, the photographer 160 may recognize information that relates to an image of a type of the external device or a serial number corresponding to the external device, and the processor 130, by comparing an image that relates to a type of the external device recognized via the photographer 160 with a prestored image of the various external devices, may identify the external device and select information that relates to the external device, and obtain information that relates to the external device based on the serial number recognized via the photographer 160.

In addition, the display apparatus 100, via short distance wireless communication such as NFC (Near Field Communication) or RFID (radio frequency identification), may receive information that relates to the external device, and the processor 130 may select a communication protocol based on information that relates to the external device which is received via short distance communication such as NFC or RFID.

Figure 9:
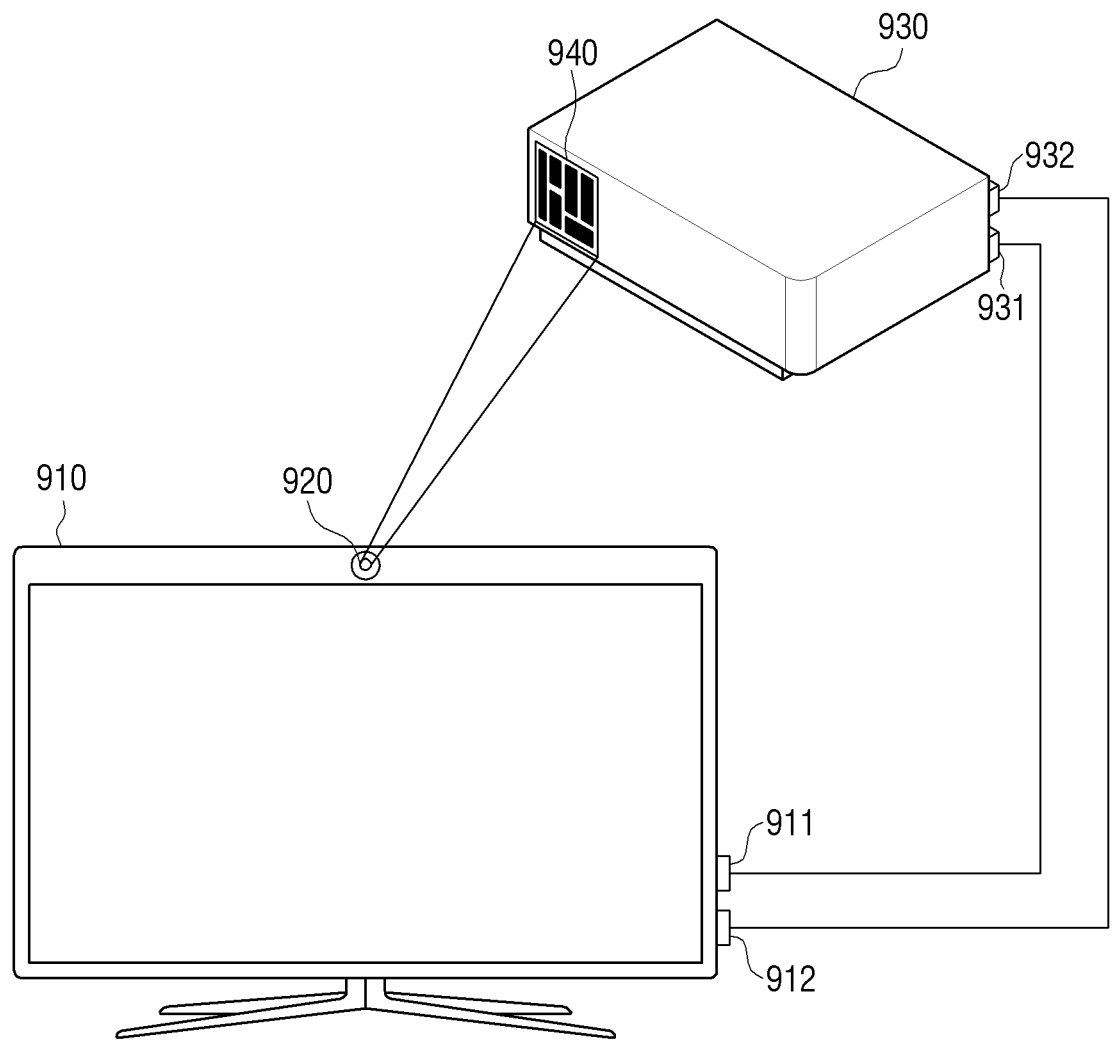
FIG. 9 is a view to illustrate a method of receiving information that relates to an external device, according to an exemplary embodiment.

FIG. 9 is a view to illustrate a method of receiving information that relates to an external device, according to an exemplary embodiment.

Referring to FIG. 9, a display apparatus 910 includes a photographer 920, and here, the photographer 920 may be realized as a camera lens. Of course, not only the camera lens, but also an infrared transceiver and/or an optical communicator can be implemented as the photographer 920.

In addition, the display apparatus 910 and the external device 930 may be connected via the first input ports 911 and 931 which are configured in accordance with the HDMI specification, and may be connected via the second input ports 912, 932 which are configured in accordance with the UART communication method.

In addition, the QR code 940 attached to the external device 930 is recognized via the photographer 920 of the display apparatus 910, and the processor 130 of the display apparatus 910 may detect information that relates to a manufacturer, a name of a device, and a product group of the external device 930 from the QR code 940 recognized via the photographer 920.

In addition, the processor 130 may select a communication protocol required for communicating with the external device 930 based on information that relates to a manufacturer, a name of a device, and product group of the external device 930, and control to communicate with the external device 930 via the second input port 912 by using the selected communication protocol.

In this aspect, in the above-described examples, the processor 130 may receive, from the external device, information that relates to an image and a sound via the first input port 110, and receive a control command to control the display apparatus 100 via the second input port 120. The above has been already described and further description will be omitted.

Figure 10:
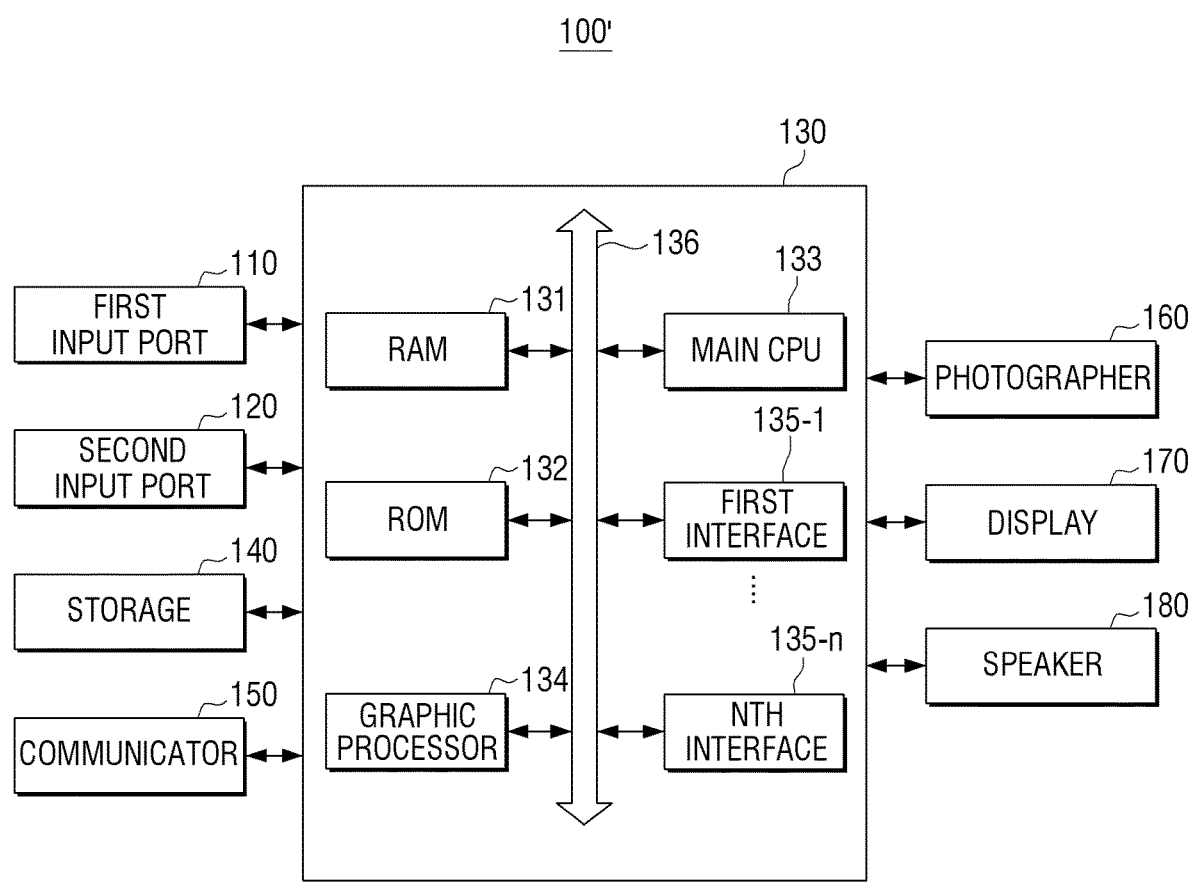
FIG. 10 is a block diagram illustrating detailed configurations of the display apparatus illustrated in FIG. 1.

FIG. 10 is a block diagram illustrating detailed configurations of the display apparatus illustrated in FIG. 1.

Referring to FIG. 10, a display apparatus 100' includes the first input port 110, the second input port 120, the processor 130, the storage 140, the communicator 150, the photographer 160, a display 170, and a speaker 180. From among the components illustrated in FIG. 10, the portion that is duplicative with FIG. 1 will not be further described.

The processor 130 controls overall operations of the display apparatus 100'.

In particular, the processor 130 includes random access memory (RAM) 131, read-only memory (ROM) 132, main central processing unit (CPU) 133, graphic processor 134, the first to nth interface 135-1~135-n, and bus 136.

The RAM 131, ROM 132, main CPU 133, graphic processor 134, and the $1^{st}$ to nth interface 135-1~135-n may be interconnected via bus 136.

The $1^{st}$ to nth interface 135-1 to 135-n are connected with above-described elements. One of the interfaces may be a network interface connected with the external device via a network.

The main CPU 133, by accessing the storage 140, performs booting by using the operating system (O/S) stored in the storage 140. In addition, various operations can be performed by using programs, contents, and data stored in the storage 140.

In the ROM 132, a command set for booting up the system is stored. When a turn-on command is input and power is supplied, the main CPU 133, according to a command stored in the ROM 132, copies the O/S stored in the storage 140 to the RAM 131, executes the O/S, and boots up the system. When booting is completed, the main CPU 133 copies application programs stored in the storage 140 to the RAM 131, executes the application programs copied to the RAM 131, and performs various operations.

The graphic processor 134 generates a screen that may include any of various objects such as an icon, an image, and text using a calculator (not shown) and a renderer (not shown). The calculator (not shown), based on the received control command, calculates attribute values, such as a coordinate value that corresponds to a location at which each object is displayed according to layouts of a screen, shape, size, and color. The renderer (not shown) generates a screen of various layouts including objects based on attribute values calculated by the calculator (not shown). In particular, the graphic processor 134 converts a system response generated in response to a user's utterance to a text, and determines a font, a size, and a color of characters. The screen generated by the renderer (not shown) may be displayed via the display 170.

In this aspect, the operations of the aforementioned processor 130 may be implemented by a program stored in the storage 140.

The storage 140 stores various data, such as an O/S software module to drive the display apparatus 100', and various multimedia contents.

In particular, the storage 140, based on the information that relates to the external device which is received via the first input port 110, may include a software module which is usable to automatically select a communication protocol that corresponds to the second input port 120 and thereby facilitate communication with the external device by using the selected communication protocol. This will be further described below with reference to FIG. 11.

The display 170 may display various objects, including all of the video and/or still images, photos, and documents which can be displayed with a specific frame ratio and are generated as a plurality of images, such as a movie, drama, recorded video, and slow video.

In this aspect, the display 170 may be realized as any of a Liquid Crystal Display (LCD), Organic Light Emitting Display (OLED) or Plasma Display Panel (PDP), or the like.

In particular, the display 170 may display contents based on information that relates to an image received via the first input port 110.

In addition, the speaker 180 may output an audio signal based on information that relates to audio received via the first input port 110.

Figure 11:
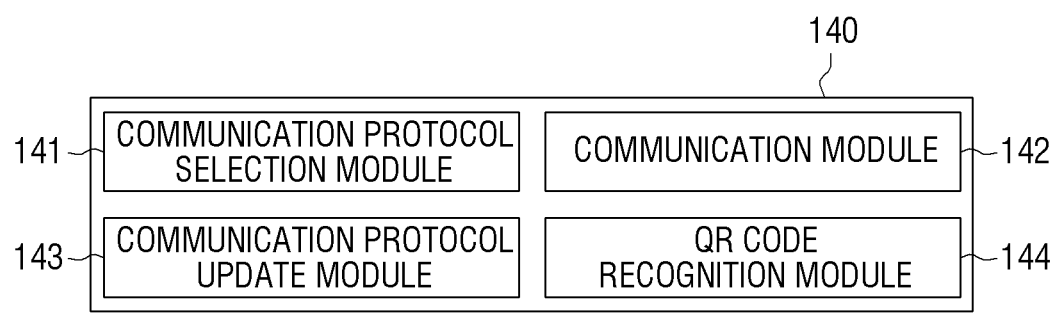
FIG. 11 is a view of software module stored in the storage, according to an exemplary embodiment.

FIG. 11 is a view of software module stored in the storage, according to an exemplary embodiment.

Referring to FIG. 11, the storage 140 may store a communication protocol selection module 141, a communication module 142, a communication protocol update module 143, and a QR code recognition module 144, and/or the like.

In this aspect, the operations of the processor 130 may be implemented by a program stored in the storage 140. Hereinbelow, the detailed operations of the processor 130 using a program stored in the storage 140 will be further described.

In particular, the communication protocol module 141, based on information that relates to the external device received via the first input port 110, may perform a function to select a communication protocol that corresponds to the second input port 120. More particularly, the communication protocol selection module 141, by using a lookup table within which information that relates to a communication protocol matched with information that relates to the external device is stored, may perform a function to select the communication protocol based on the information that relates to the external device received via the first input port 110.

In addition, the communication module 142 is a module configured to facilitate communication with outside entities. The communication module 142 may include any of a device module used for communication with the external device, a messenger program, an SMS (Short Message Service) & MMS (Multimedia Message Service) program, and an e-mail program, a program module such as Call Info Aggregator, and a telephone module including a voice-over Internet protocol (VoIP) module.

In particular, the communication module 142 according to an exemplary embodiment may communicate with a server in order to transmit and/or receive data.

The communication protocol update module 143 may further add information that relates to a communication protocol received from a server to the storage 140 and update information that relates to a plurality of communication protocols.

In addition, the QR code recognition module 144 may analyze and identify a QR code of the external device recognized via the photographer 160.

As such, the processor 130, using various software modules stored in the storage 140 and based on information that relates to the external device received via the first input port 110, may control to automatically select a communication protocol that corresponds to the second input port 120 and communicate with the external device via the second input port 120 by using the selected communication protocol.

Figure 12:
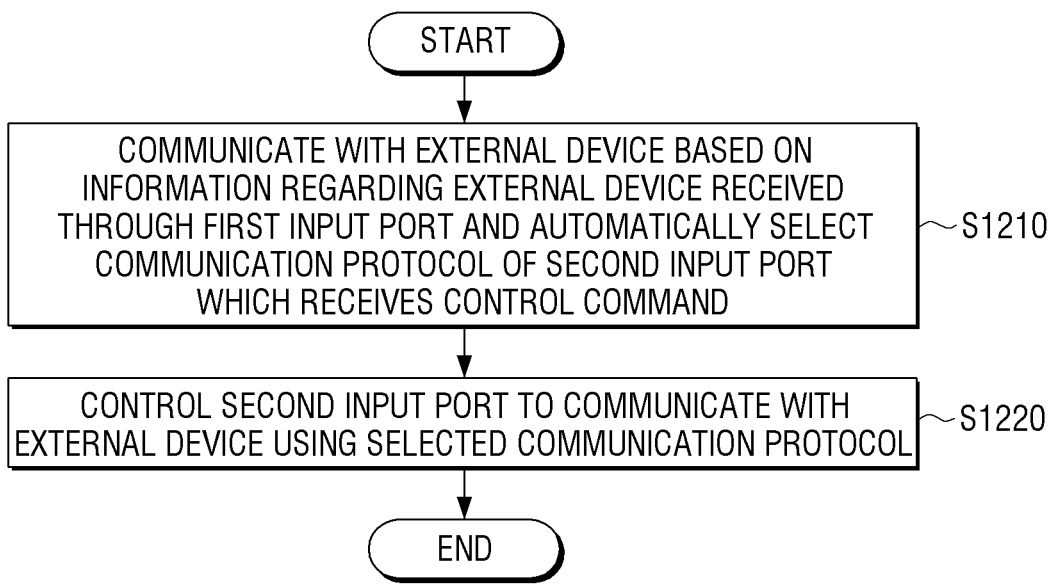
FIG. 12 is a flowchart to describe a method of controlling the display apparatus, according to an exemplary embodiment.

FIG. 12 is a flowchart to describe a method for controlling the display apparatus, according to an exemplary embodiment.

Referring to FIG. 12, a method of a display apparatus which includes a first input port configured to receive information that relates to the external device and a second input port configured to facilitate a communication with the external device and to receive a control command includes, as operation S1210, automatically selecting a communication protocol that corresponds to the second input port based on the information that relates to the external device received via the first input port.

In addition, the method includes, as operation S1220, controlling to communicate with the external device via the second input port by using the selected communication protocol.

In particular, the information that relates to the external device may include information that relates to at least one of a manufacturer of the external device, a name of the external device, and a product group of the external device.

In addition, information that relates to the external device may be stored in the SPD (Source Product Description) packet.

In addition, the SPD packet may include a plurality of fields which respectively indicate information that relates to a manufacturer, a name of a device, and a product group of the external device.

In addition, the first input port may be configured in accordance with the specification of HDMI (high definition multimedia interface).

In addition, the selecting may include selecting a communication protocol which is required for communicating with the external device from among a plurality of communication protocols that are prestored based on information that relates to the external device.

Further, the selecting may include receiving, from a server, information that relates to a communication protocol required for communicating with the external device based on information that relates to the external device, and the controlling may include communicating with the external device based on information that relates to a communication protocol received from a server.

Further, the controlling method of the display apparatus according to an exemplary embodiment may further include storing additional information that relates to a communication protocol received via a server and updating information that relates to a prestored plurality of communication protocols.

In addition, the second input port may be configured to use a UART (Universal Asynchronous Receiver Transmitter communication method.

Further, a non-transitory computer readable medium which stores a program which sequentially performs the controlling method may be provided.

For example, a non-transitory computer readable medium may be configured to store a program which performs the step of automatically selecting a communication protocol that corresponds to the second input port based on information that relates to the external device received via the first input port and the step of controlling to communicate with the external device via the second input port by using the selected communication protocol.

The non-transitory recordable medium refers to a medium which may store data semi-permanently rather than storing data for a short time such as a register, a cache, and a memory, and may be readable by an apparatus. For example, the non-transitory readable medium may include any of a CD, DVD, hard disk, Blu-ray disk, USB, memory card, ROM, and/or any other suitable medium.

In addition, although some of the block diagrams illustrating the display apparatus do not include a bus, it will be understood by persons having ordinary skill in the art that communication among each element in the display apparatus can be performed via a bus. Further, each device may further include a processor, such as CPU, which is configured to perform the aforementioned various steps, and/or a microprocessor.

The foregoing exemplary embodiments and advantages are merely exemplary and are not to be construed as limiting the present inventive concept. The exemplary embodiments can be readily applied to other types of apparatuses. The description of the exemplary embodiments is intended to be illustrative, and not to limit the scope of the claims, and many alternatives, modifications, and variations will be apparent to those of ordinary skill in the art.

What is claimed is:

1. A display apparatus comprising:
    a first input port configured to receive information that relates to an external device;
    a second input port configured to facilitate a communication with the external device and to receive a control command; and
    a processor configured to identify a communication protocol of the second input port based on the received information that relates to the external device, and to perform the communication with the external device via the second input port by using the identified communication protocol,
    wherein the information that relates to the external device comprises at least one from among information that relates to a manufacturer of the external device, a name of the external device, and a product group that relates to the external device, and
    wherein the communication protocol is a set of rules for the display apparatus to communicate with the external device.

2. The display apparatus as claimed in claim 1, wherein the information that relates to the external device is stored in a source production description (SPD) packet.

3. The display apparatus as claimed in claim 2, wherein the SPD packet comprises a plurality of fields which respectively indicate the information that relates to the manufacturer of the external device, the name of the external device, and the product group that relates to the external device.

4. The display apparatus as claimed in claim 1, wherein the first input port is configured in accordance with a high definition multimedia interface (HDMI) specification.

5. The display apparatus as claimed in claim 1, further comprising:
    a storage configured to store information that relates to a plurality of communication protocols,
    wherein the processor is further configured to:
    select the communication protocol that corresponds to the second input port from among the plurality of communication protocols based on the received information that relates to the external device.

6. The display apparatus as claimed in claim 1, further comprising:
    a communicator configured to communicate with a server,
    wherein the processor is further configured to:
    receive, from the server via the communicator, information that relates to a communication protocol required for communicating with the external device, and to communicate with the external device based on the information that relates to the communication protocol received from the server.

7. The display apparatus as claimed in claim 6, further comprising:
    a storage configured to store information that relates to a plurality of communication protocols,
    wherein the processor is further configured to:
    control the storage to store the information that relates to the communication protocol received from the server, and to update the information that relates to the plurality of communication protocols.

8. The display apparatus as claimed in claim 1, wherein the second input port is configured to use a universal asynchronous receiver transmitter (UART) communication method.

9. The display apparatus as claimed in claim 1, further comprising:
    a photographer,
    wherein the processor is further configured to use the photographer for recognizing a quick response (QR) code attached to the external device, and to obtain the information that relates to the external device based on the recognized QR code.

10. The display apparatus as claimed in claim 1, wherein the processor is further configured to:
    receive, from the external device, information that relates to an image and a sound via the first input port, and to receive the control command for controlling the display device via the second input port.

11. A method for controlling a display apparatus which includes a first input port configured to receive information that relates to an external device and a second input port configured to facilitate a communication with the external device and to receive a control command, the method comprising:
    identifying a communication protocol of the second input port based on the received information that relates to the external device; and
    performing the communication via the second input port with the external device by using the identified communication protocol,
    wherein the information that relates to the external device comprises at least one from among information that relates to a manufacturer of the external device, a name of the external device, and a product group that relates to the external device, and wherein the communication protocol is a set of rules for the display apparatus to communicate with the external device.

12. The method as claimed in claim 11, wherein the information that relates to the external device is stored in a source product description (SPD) packet.

13. The method as claimed in claim 12, wherein the SPD packet comprises a plurality of fields which respectively indicate the information that relates to the manufacturer of the external device, the name of the external device, and the product group that relates to the external device.

14. The method as claimed in claim 11, wherein the first input port is configured in accordance with a high definition multimedia interface (HDMI) specification.

15. The method as claimed in claim 11, wherein the identifying comprises:

selecting the communication protocol from among a plurality of communication protocols based on the received information that relates to the external device.

16. The method as claimed in claim 11, wherein the identifying comprises receiving, from a server, information that relates to a communication protocol required for communicating with the external device, and wherein the performing the communication comprises communicating with the external device based on the information that relates to the communication protocol received from the server.

17. The method as claimed in claim 16, further comprising:

storing the information that relates to the communication protocol received from the server and updating information that relates to a plurality of communication protocols.

18. The method as claimed in claim 11, wherein the second input port is configured to use a universal asynchronous receiver transmitter (UART) communication method.

* * * * *